(12) United States Patent
Gao (10) Patent No.: US 12,122,407 B2
(45) Date of Patent: Oct. 22, 2024

(54) METHOD AND APPARATUS FOR DETERMINING NAVIGATION PROMPT INFORMATION, STORAGE MEDIUM AND ELECTRONIC DEVICE

(71) Applicant: Tencent Technology (Shenzhen) Company Limited, Shenzhen (CN)

(72) Inventor: Xuan Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 217 days.

(21) Appl. No.: 17/989,616

(22) Filed: Nov. 17, 2022

(65) Prior Publication Data
US 2023/0078656 A1  Mar. 16, 2023

Related U.S. Application Data (63) Continuation of application No. PCT/CN2021/140766, filed on Dec. 23, 2021.

(30) Foreign Application Priority Data

Jan. 4, 2021 (CN) .......................... 202110000633.2

(51) Int. Cl.
*B60W 50/14* (2020.01)
*B60W 40/06* (2012.01)

(52) U.S. Cl.
CPC ............ *B60W 50/14* (2013.01); *B60W 40/06* (2013.01); *B60W 2540/18* (2013.01); *B60W 2552/53* (2020.02); *B60W 2556/40* (2020.02)

(58) Field of Classification Search
CPC .. B60W 50/14; B60W 40/06; B60W 2552/53; B60W 2556/40; B60W 2540/18
See application file for complete search history.

(56) References Cited

U.S. PATENT DOCUMENTS 4,663,719 A * 5/1987 Matsumoto ............ G01C 21/26
701/518
4,882,696 A * 11/1989 Nimura .................. G01C 21/36
73/178 R
(Continued)

FOREIGN PATENT DOCUMENTS

CN     101975577 A    2/2011
CN     104613969 A    5/2015
(Continued)

OTHER PUBLICATIONS

Tencent Technology, ISR, PCT/CN2021/140766, Mar. 23, 2022, 3 pgs.

(Continued)

*Primary Examiner* — Chico A Foxx
(74) *Attorney, Agent, or Firm* — Morgan, Lewis & Bockius LLP (57) ABSTRACT

A method for determining navigation prompt information is performed by a computer device, the method including: acquiring a first set of road shape points associated with a target road segment from map data; determining at least one target steering angle between every two adjacent line segments formed by every three adjacent road shape points in the first set of road shape points; searching the target road segment for a non-fork diversion position according to the target steering angle, the non-fork diversion position being used for indicating that the target road segment includes a turn road segment with a non-fork junction on the target road segment; and setting the navigation prompt information according to the non-fork diversion position to be broadcast for the turn road segment according to road information of a road segment adjacent to the target road segment in a preset driving direction along the target road segment.

20 Claims, 5 Drawing Sheets

(56) References Cited

U.S. PATENT DOCUMENTS

| | | | | |
|---|---|---|---|---|
| 6,081,609 | A * | 6/2000 | Narioka | G01C 21/26 |
| | | | | 382/113 |
| 7,280,895 | B2 * | 10/2007 | Mabuchi | B60K 31/0066 |
| | | | | 701/29.1 |
| 7,603,230 | B2 * | 10/2009 | Suzuki | G01C 21/3632 |
| | | | | 340/995.12 |
| 11,486,717 | B1 * | 11/2022 | Kobitzsch | G01C 21/3632 |
| 2004/0143387 | A1 * | 7/2004 | Shimizu | G08G 1/096838 |
| | | | | 340/995.23 |
| 2008/0027607 | A1 * | 1/2008 | Ertl | B60W 40/06 |
| | | | | 701/123 |
| 2010/0188200 | A1 * | 7/2010 | Hashimoto | B60W 50/14 |
| | | | | 340/435 |
| 2010/0332132 | A1 * | 12/2010 | Okude | G08G 1/096816 |
| | | | | 701/414 |
| 2013/0066549 | A1 * | 3/2013 | Wu | G01C 21/3658 |
| | | | | 701/425 |
| 2015/0185026 | A1 * | 7/2015 | Hightower | G01C 21/3658 |
| | | | | 701/533 |
| 2015/0350834 | A1 * | 12/2015 | Chen | H04W 68/005 |
| | | | | 455/456.1 |
| 2016/0119897 | A1 * | 4/2016 | Kim | H04M 1/72454 |
| | | | | 455/569.2 |
| 2017/0199051 | A1 * | 7/2017 | Kim | G01C 21/3658 |
| 2018/0135999 | A1 * | 5/2018 | Kim | G01C 21/3658 |
| 2019/0337517 | A1 * | 11/2019 | Anderson | F16H 61/0213 |
| 2022/0084458 | A1 * | 3/2022 | Sakuma | G09G 3/2096 |
| 2023/0365124 | A1 * | 11/2023 | Shahriari | B60W 30/09 |
| 2024/0182061 | A1 * | 6/2024 | Wabeke | B60K 35/29 |

FOREIGN PATENT DOCUMENTS

| | | | | |
|---|---|---|---|---|
| CN | 104949679 | A | 9/2015 | |
| CN | 105526944 | A | 4/2016 | |
| CN | 107301783 | A | 10/2017 | |
| CN | 109523810 | A | 3/2019 | |
| CN | 111829543 | A | 10/2020 | |
| CN | 112325889 | A | 2/2021 | |
| CN | 112325889 | B * | 4/2021 | B60W 40/06 |
| EP | 0346491 | A1 * | 12/1989 | G01C 21/367 |
| EP | 0580105 | A1 | 1/1994 | |
| EP | 827125 | A2 * | 3/1998 | G01C 21/3644 |
| EP | 1947421 | A1 | 7/2008 | |
| EP | 4246090 | A1 * | 9/2023 | B60W 40/06 |
| JP | S 6416917 | A | 1/1989 | |
| JP | 2001101598 | A | 4/2001 | |
| JP | 3683136 | B2 * | 8/2005 | |
| WO | WO-2015149551 | A1 * | 10/2015 | G01C 21/26 |

OTHER PUBLICATIONS

Tencent Technology, WO, PCT/CN2021/140766, Mar. 23, 2022, 7 pgs.

Tencent Technology, IPRP, PCT/CN2021/140766, Jul. 4, 2023, 8 pgs.

Tencent Technology, Extended European Search Report, EP Patent Application No. 21914125.6, Apr. 23, 2024, 9 pgs.

* cited by examiner

METHOD AND APPARATUS FOR DETERMINING NAVIGATION PROMPT INFORMATION, STORAGE MEDIUM AND ELECTRONIC DEVICE

CROSS-REFERENCE TO RELATED APPLICATIONS

This application is a continuation application of PCT Patent Application No. PCT/CN2021/140766, entitled "METHOD AND APPARATUS FOR DETERMINING NAVIGATION PROMPT INFORMATION, AND STORAGE MEDIUM AND ELECTRONIC DEVICE" filed on Dec. 23, 2021, which claims priority to Chinese Patent Application No. 202110000633.2, filed with the State Intellectual Property Office of the People's Republic of China on Jan. 4, 2021, and entitled "METHOD AND APPARATUS FOR DETERMINING NAVIGATION PROMPT INFORMATION, STORAGE MEDIUM AND ELECTRONIC DEVICE", all of which are incorporated herein by reference in their entirety.

FIELD OF THE TECHNOLOGY

This application relates to the technical field of maps, in particular to a method and apparatus for determining navigation prompt information, a storage medium and an electronic device.

BACKGROUND OF THE DISCLOSURE

When people drive to a certain destination but are unfamiliar with road conditions or want to know about road information, it is necessary to use a map navigation system. During practical application, the map navigation system can give a prompt according to a practical road condition of a map, for example, when a vehicle or a pedestrian drives on a road with a curve and a fork junction, in the driving process, there is a non-fork turn curve at 50 meters ahead, there is a fork junction at 70 meters in front of a road A, and the map navigation system will prompt "turn right at 50 meters ahead", and will prompt "go straight at 70 meters ahead" without lane changing.

Prompting "turn right at 50 meters ahead" will cause interference to the pedestrian or a driver passing by the non-fork turn curve nearby the fork junction, for example, the driver mistakenly thinks to turn right at the nearby fork junction ahead, which possibly causes user off-course. For another example, it is unnecessary to prompt "turn right at 50 meters ahead" to a certain degree when there is a roundabout road ahead, which causes waste of navigation resources.

For the foregoing problem, no effective solution has been provided yet.

SUMMARY

A method for determining navigation prompt information is performed by a computer device, the method including:
acquiring a first set of road shape points associated with a target road segment from map data;
determining at least one target steering angle between every two adjacent line segments formed by every three adjacent road shape points in the first set of road shape points;
searching the target road segment for a non-fork diversion position according to the target steering angle, the non-fork diversion position being used for indicating that the target road segment includes a turn road segment with a non-fork junction on the target road segment; and
setting the navigation prompt information according to the non-fork diversion position when it is determined that the navigation prompt information is to be broadcast for the turn road segment according to road information of a road segment adjacent to the target road segment in a preset driving direction along the target road segment.

An apparatus for determining navigation prompt information includes:
an acquisition unit, configured to acquire a first set of road shape points associated with a target road segment from map data;
a search unit, configured to determine a target steering angle formed by the first set of road shape points according to line segments between every two adjacent road shape points in the first set of road shape points, and search the target road segment for a non-fork diversion position, the non-fork diversion position being used for indicating that the target road segment includes a turn road segment with a non-fork junction on the target road segment;
a setting unit, configured to set the navigation prompt information according to the non-fork diversion position when it is determined that the navigation prompt information is to be broadcast for the turn road segment according to road information of a road segment adjacent to the target road segment in a preset driving direction along the target road segment.

A computer device is provided, including a memory and one or more processors, where the memory stores computer-readable instructions, and when the computer-readable instructions are executed by the one or more processors, the computer device is caused to perform the method for determining navigation prompt information.

One or more non-transitory computer-readable storage media are provided, storing computer-readable instructions, the computer-readable instructions, when being executed by one or more processors of a computer device, causing the computer device to perform the method for determining navigation prompt information.

A computer program product or a computer program is provided, the computer program product or the computer program including computer-readable instructions, the computer-readable instructions being stored in a non-transitory computer-readable storage medium. A processor of a computer device reads the computer-readable instructions from the computer-readable storage medium, and the processor executes the computer-readable instructions, to cause the computer device to perform the method for determining navigation prompt information.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

To enable a person skilled in the art to understand the solutions in this application more clearly, the following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of the present disclosure without making any creative effort fall within the protection scope of the present disclosure.

In this specification, claims, and accompanying drawings of this application, the terms "first", "second", and the like are intended to distinguish similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Further, the terms "include", "comprise", "possess", and any variations thereof, are intended to cover non-exclusive inclusion. For example, a process, method, system, product, or device that includes or comprises a series of steps or units is not necessarily limited to the expressly enumerated steps or units, but may include other steps or units that are not expressly enumerated or that are inherent to the process, method, product, or device.

In order to better understand the embodiments provided in this application, some of the terms are described as follows:

Fork junction: a forked place on a road, such as an intersection of a main road and a divergent path.

Non-fork junction: only with one access road, such as a non-fork curve.

Adjacent side: other roads connected to a current road.

Recall: recognized by a policy and considered to be a scenario conforming to the current policy.

Shape point: a point string for representing and describing a road shape.

Roundabout-like: a road shaped like a roundabout, but actually not the roundabout.

Inter-Change (IC): an in-out ramp of an expressway, which connects the expressway and other different grades of roads.

JCT: short for Junction, a connection road between expressways (such as between expressways and between expressways and urban expressways), such as a fork junction or a confluent point.

Ramp: a connection road between cross roads, which usually have no independent road name. Multiple ramps at the same intersection are usually collectively referred to as a rubber bridge.

Other roads: narrow roads, roads with poor road conditions, roads with lanes seriously occupied, roads with non-smooth passage or roads only used in areas.

Dead end road: a road not connected to any other roads in a driving direction.

According to an aspect of the embodiments of this application, a method for determining navigation prompt information is provided. In some embodiments, the method for determining navigation prompt information may be applied to, but not limited to an application environment shown in FIG. 1. The application environment includes a terminal 102, a network 104, and a server 106.

Figure 1:
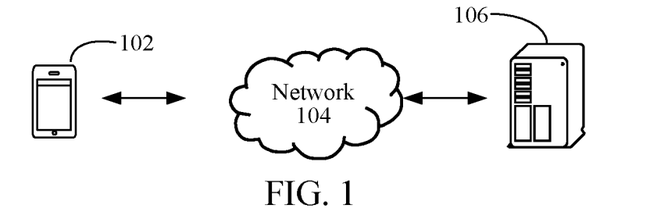
FIG. 1 is a schematic diagram of an application environment of an exemplary method for determining navigation prompt information according to an embodiment of this application.

In an embodiment, a server 106 may acquire a first set of road shape points associated with a target road segment from map data; a target steering angle formed by the first set of road shape points is determined according to line segments between every two adjacent road shape points in the first set of road shape points, and the target road segment is searched for a non-fork diversion position according to the target steering angle. The non-fork diversion position is used for indicating that the target road segment includes a turn road segment with a non-fork junction on the target road segment; and the navigation prompt information is set according to the non-fork diversion position when the non-fork diversion position is found and it is determined that the navigation prompt information is to be broadcast for the turn road segment according to road information of a road segment adjacent to the target road segment, and the navigation prompt information may be broadcast when a vehicle drives to a reasonable target position on the target road segment. The purposes of determining whether the navigation prompt information is set or not and reasonably setting a navigation information broadcast position according to the target steering angle formed by the first set of road shape points under the situation that the road has the non-fork junction are achieved. Accordingly, the technical effect of reasonably determining whether navigation broadcast is performed at the road target position or not according to road parameters is achieved, thereby solving the technical problem in the related art that the navigation information broadcast position is improper in a map navigation process, which causes interference to a user.

The method for determining navigation prompt information may be executed by the terminal 102 or cooperatively executed by the terminal 102 and the server 106. The above is merely an example, and constitutes no limitation on this embodiment.

In some embodiments, the terminal 102 may be a terminal provided with a target client and may include, but is not limited to, at least one of the following: a mobile phone (for example, an Android mobile phone, or an iOS mobile phone), a notebook computer, a tablet computer, a palmtop computer, a mobile Internet device (MID), a PAD, a desktop computer, a smart TV, and the like. A target client may be a map client and the like. The network may include, but is not limited to, a wired network and a wireless network. The wired network includes: a local area network, a metropolitan area network, and a wide area network. The wireless network includes: Bluetooth, Wi-Fi, and another network implementing wireless communication. The server may be an independent server, a server cluster formed by a plurality of servers, or a cloud server. The above is merely an example, and constitutes no limitation on this embodiment.

Figure 2:
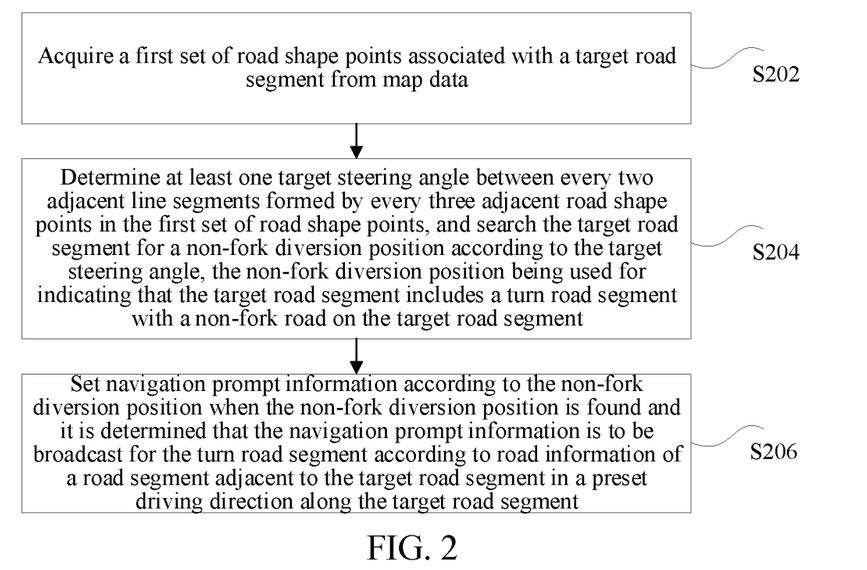
FIG. 2 is a flowchart of an exemplary method for determining navigation prompt information according to an embodiment of this application.

In some embodiments, as shown in FIG. 2, for example, the method for determining navigation prompt information is executed by an electronic device (such as the terminal 102 or the server 104 in FIG. 1), and includes the following steps:

Step S202. Acquire a first set of road shape points associated with a target road segment from map data.

Step S204. Determine at least one target steering angle between every two adjacent line segments formed by every three adjacent road shape points in the first set of road shape points, and search the target road segment for a non-fork diversion position according to the target steering angle, the non-fork diversion position being used for indicating that the target road segment includes a turn road segment with a non-fork junction on the target road segment.

Step S206. Set the navigation prompt information according to the non-fork diversion position when the non-fork diversion position is found and it is determined that the navigation prompt information is to be broadcast for the turn road segment according to road information of a road segment adjacent to the target road segment in a preset driving direction along the target road segment.

The method for determining navigation prompt information above may include but not limited to be applied to navigation, such as mobile phone map navigation, vehicle-mounted map navigation and other navigation scenarios. Whether voice broadcast is performed on the front non-fork diversion position or not is determined according to a set of road shape points on the target road segment during navigation broadcast. Whether navigation broadcast needs to be performed on the road target position or not is reasonably determined according to road parameters, thereby avoiding resource waste caused by voice broadcast for turn road segments having no need of navigation broadcast in the road, and solving the problem of poor navigation effect caused by interference on drivers due to the unreasonable voice broadcast.

In an embodiment, the navigation prompt information is set at a non-fork diversion position and may be broadcast in the form of voice "at 30 meters ahead, go straight ahead to the left" so that a user can acquire road conditions in time.

Figure 3:
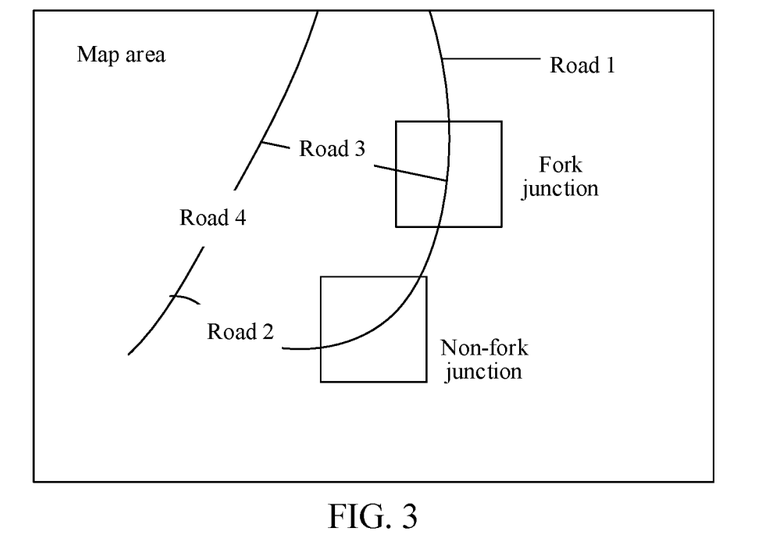
FIG. 3 is a schematic diagram of an exemplary road condition according to an embodiment of this application.

FIG. 3 is a schematic diagram of road conditions according to an embodiment. Referring to FIG. 3, although a non-fork junction on a road 2 is high in road curve degree, there is still a fork junction for the road 2 and a road 3 nearby the non-fork junction. Therefore, non-fork voice broadcast prompts will cause unnecessary interference to the user when the user passes by the non-fork junction, resulting in off-course.

In an embodiment of this application, whether voice broadcast is performed on the front non-fork diversion position or not is determined according to a set of road shape points on a target road segment during navigation broadcast. Accordingly, road condition voice broadcast may be performed according to practical road conditions, and interference on the user due to voice broadcast on all non-fork diversion junctions is avoided.

Figure 4:
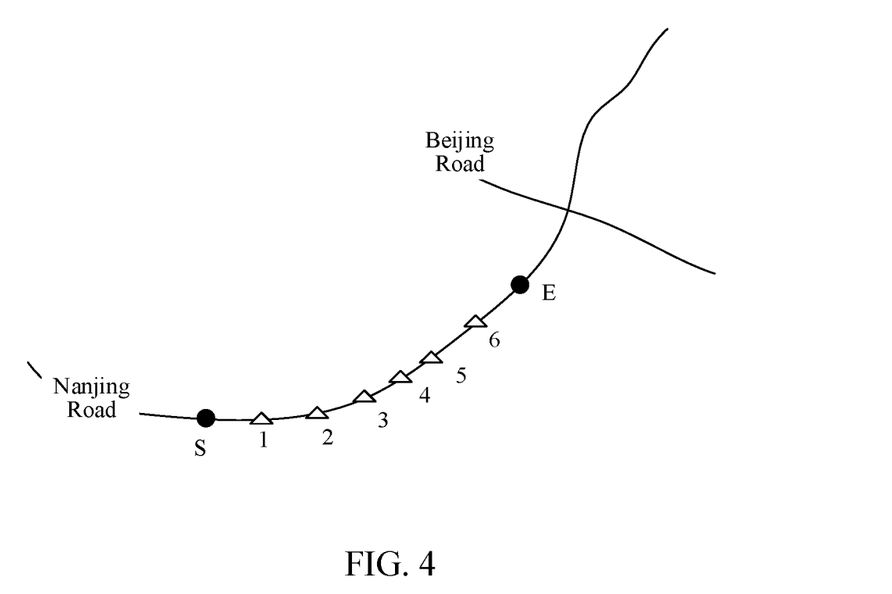
FIG. 4 is a schematic diagram of an exemplary target road segment according to an embodiment of this application.

FIG. 4 is a schematic diagram of a target road segment according to an embodiment. Referring to FIG. 4, a section of road shape points 1-6 on Nanjing Road are a set of road shape points on a target road segment. The road shape points are used for describing each point of a shape of the target road segment. A set of road shape points exist in a section of road with curves and no forks shown in FIG. 4. The shape points are shown as triangles. The shape of the target road segment can be known through parameters between the set of road shape points, for example, whether the target road segment has a non-fork curve and a fork junction or not, etc.

In an embodiment of this application, the electronic device acquires a set of road shape points, every two adjacent points in the set of road shape points may be connected into a line segment, and an angle may be formed by every two adjacent line segments, and is recorded as a steering angle. A set of road shape points may form a target steering angle when there is a curve on the road.

The electronic device sets navigation prompt information according to a non-fork diversion position when the non-fork diversion position is found and it is determined that the navigation prompt information is to be broadcast for the turn road segment according to road information of a road segment adjacent to the target road segment. In other words, when the navigation prompt information is set, if the position is the non-fork diversion position, the road information of the road segment adjacent to the position also needs to be considered to determine whether the navigation prompt information for the turn road segment is broadcast or not, thereby reducing resource waste caused by unnecessary broadcast and avoiding misleading a user by the navigation broadcast at the non-fork diversion position having no need of broadcast.

In an embodiment, at step S202, the acquiring a first set of road shape points associated with a target road segment from map data may include the following steps: determining a target end point in a preset driving direction from a target start point on the target road in the map data, where a road segment between the target start point and the target end point is the target road segment; and acquiring the first set of road shape points on the road segment between the target start point and the target end point. The target start point may be a current driving end position point.

In an embodiment, the electronic device may determine a point reached after advancing by a preset distance as the target end point in response to without passing by a fork junction in a process of advancing by the preset distance in the driving direction from the target start point. In an embodiment, the electronic device may determine a target point on a target adjacent road as the target end point in response to passing by the fork junction in the process of advancing by the preset distance in the driving direction from the target start point under the situation that a target adjacent road exists in multiple adjacent roads connected to the fork junction, where a distance between the target end point and the target start point is the preset distance, the target adjacent road is an adjacent road whose angle between the road direction and the driving direction is smaller than a preset third angle threshold in the multiple adjacent roads connected to the fork junction, or the target adjacent road is an adjacent road whose angle between the road direction and the driving direction is smaller than a preset third angle threshold and having the same road grade and/or the same road property as a target road in the multiple adjacent roads connected to the fork junction.

In an embodiment, the electronic device may determine a point where a fork junction is located as the target end point in response to passing by the fork junction in the process of advancing by the preset distance in the driving direction from the target start point under the situation that no target adjacent road conforming to above conditions exists in multiple adjacent roads connected to the fork junction.

In an embodiment, the searching a target road segment for a non-fork diversion position according to a target steering angle formed by a first set of road shape points may include the following steps:

S1. Acquire steering angles formed by every three adjacent road shape points in the first set of road shape points to form a set of steering angles, where the steering angles formed by the every three adjacent road shape points include included angles between extension lines of first line segments and second line segments, the first line segments are line segments between first road shape points and second road shape points in the every three adjacent road shape points, and the second line segments are line segments between the second road shape points and third road shape points in the every three adjacent road shape points.

S2. Search the target road segment for the non-fork diversion position according to the set of steering angles.

Figure 5:
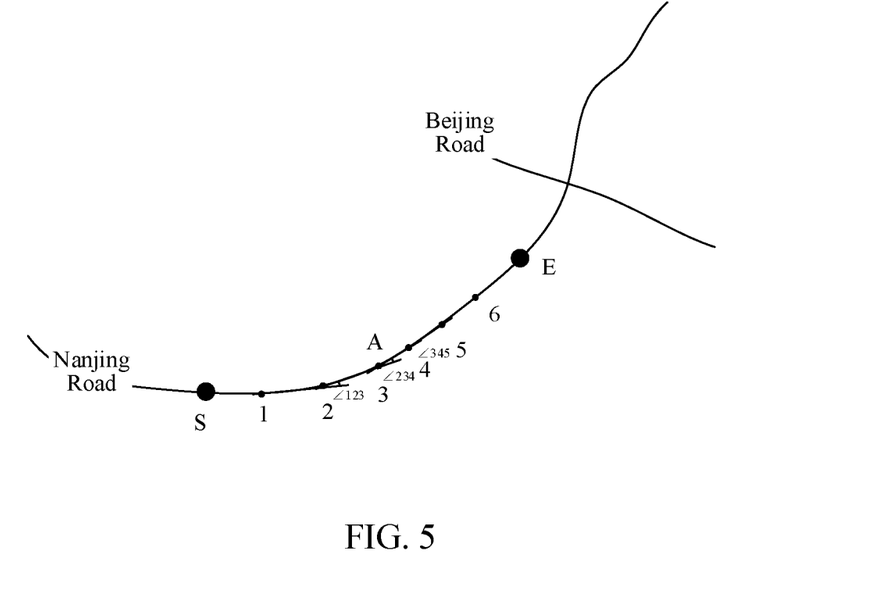
FIG. 5 is a schematic diagram of exemplary steering angle calculation according to an embodiment of this application.

FIG. 5 is a schematic diagram of calculating the steering angle according to an embodiment. As shown in FIG. 5, a set of road shape points include a plurality of points, such as 6 shape points numbered as 1, 2, 3, 4, 5 and 6. A steering angle is formed by every three shape points on a target road segment, such as $\angle 123$, $\angle 234$ and $\angle 345$. It needs to be explained that $\angle 123$ is determined by an extension line of a connecting line of a shape point 1 and a shape point 2 and an extension line of a connecting line of the shape point 2 and a shape point 3 and is an included angle between the two connecting lines or extension lines. To facilitate calculation, the steering angle may be an acute angle between the two connecting lines or extension lines, and in such a way, $\angle 234$ may be determined according to the shape point 2, the shape point 3 and a shape point 4, and $\angle 345$ may be determined according to the shape point 3, the shape point 4 and a shape point 5 in sequence.

The searching a target road segment for a non-fork diversion position according to a set of steering angles may include the following steps: determining a cumulative steering angle corresponding to a first target position on the target road segment according to the set of steering angles; and determining whether the first target position is the non-fork diversion position or not according to the cumulative steering angle.

As shown in FIG. 5, the cumulative steering angle on the target road segment is obtained by adding $\angle 123$, $\angle 234$ and $\angle 345$. Then, whether the first target position is the non-fork diversion position or not is determined according to the cumulative steering angle. When the cumulative steering angle is within a preset angle range, it may be determined that the first target position is the non-fork diversion position. When the cumulative steering angle is not within the preset angle range, it may be determined that the first target position is not the non-fork diversion position, and voice navigation broadcast is not performed.

The angle range may be (68 degrees, 110 degrees), and a specific value is determined according to actual needs and is not specifically limited herein. For example, when the cumulative steering angle is greater than or equal to 68 degrees and less than 110 degrees, the cumulative steering angle is within the preset angle range, and when the cumulative steering angle is less than 68 degrees or the cumulative steering angle is greater than or equal to 110 degrees, it is determined that the cumulative steering angle is not within the preset angle range.

In an embodiment, the determining a cumulative steering angle corresponding to a first target position on the target road segment may include the following steps: acquiring a set of three-adjacent road shape points corresponding to the first target position from a first set of road shape points, where distances between the first target position and second road shape points in every three adjacent road shape points in a set of three-adjacent road shape points are less than a preset first distance threshold, acquiring steering angles formed by the set of three-adjacent road shape points from a set of steering angles; and determining the cumulative steering angle to be equal to the cumulative sum of the steering angles formed by the set of three-adjacent road shape points.

The set of three-adjacent road shape points may include a plurality of three-adjacent road shape points. For example, 6 shape points sequentially being 1, 2, 3, 4, 5 and 6 form 4 three-adjacent road shape points in one set, including shape points 1, 2 and 3, shape points 2, 3 and 4, shape points 3, 4 and 5, and shape points 4, 5 and 6. Every three adjacent road shape points may form a steering angle, and the steering angles are sequentially $\angle 123$, $\angle 234$, $\angle 345$ and $\angle 456$.

In this embodiment, the first set of road shape points may include the plurality of steering angles, and as shown in FIG. 5, 6 shape points include 4 steering angles: $\angle 123$, $\angle 234$, $\angle 345$ and $\angle 456$. The target steering angle on the target road is formed by adding steering angles meeting conditions instead of the 4 steering angles. The condition is that if distances between the first target position and second road shape points in every three adjacent road shape points in the set of three-adjacent road shape points are less than a preset first distance threshold, then the steering angles formed by the set of three-adjacent road shape points are added.

For example, if the first target position is located at the shape point 3 in FIG. 5, and a distance between the first target position and each of the shape point 3, the shape point 2 and the shape point 4 is less than a preset distance threshold while a distance between the first target position and the shape point 5 is greater than the preset distance threshold, then steering angles formed by the second road shape points in every three adjacent road shape points including the shape point 3, the shape point 2 and the shape point 4 serves as the target steering angle on the target road segment corresponding to the first target position, namely, $\angle 123$, $\angle 234$ and $\angle 345$ are added, and $\angle 456$ is not added.

It is to be understood that for a turn road segment with a non-fork junction, navigation prompt information may not be set if a steering degree is low, thereby reducing resource waste caused by setting the navigation prompt information for each turn junction; and the navigation prompt information may be set according to needs if the steering degree is high, and a position where the navigation prompt information is most suitable for being set on the turn road segment is determined, thereby improving navigation prompt information setting reasonability and reducing the situation of poor navigation effect caused by too early or too late prompt information set. The cumulative steering angle calculated through such way can accurately represent whether the first target position is on the turn road segment with the non-fork junction on the target road segment or not and the position suitable for information prompt on the turn road segment, thereby achieving the above technical effects according to the navigation prompt information set according to the non-fork junction.

In an embodiment, the determining whether the first target position is the non-fork diversion position or not according to the cumulative steering angle may include the following modes:

Mode 1: Determine the first target position as the non-fork diversion position c the cumulative steering angle is within a preset angle range.

Mode 2: Determine the first target position as the non-fork diversion position when the cumulative steering angle is within the preset angle range and a distance between the first target position and a start point in a first set of road shape points is greater than a preset first distance threshold; or determine the first target position as the non-fork diversion position when the cumulative steering angle is within the preset angle range and a distance between the first target position and an end point in the first set of road shape points is greater than a preset second distance threshold.

Mode 3: Determine the first target position as the non-fork diversion position when the cumulative steering angle is within the preset angle range, the distance between the first target position and the start point in the first set of road shape points is greater than the preset first distance threshold, and the distance between the first target position and the end point in the first set of road shape points is greater than the preset second distance threshold.

The preset angle range may be (68 degrees, 110 degrees), and the first target position is determined as the non-fork diversion position when the cumulative steering angle on the target road segment is within the preset angle range. Point A shown in FIG. 5 is the non-fork diversion position.

Then, the first target position point A is determined as the non-fork diversion position and navigation voice broadcast can be performed for this position when the cumulative steering angle on the target road segment is within the preset angle range (68 degrees, 110 degrees) and a distance 30 m between the first target position point A and a start point S of the target road segment is greater than a preset threshold 20 m.

The first target position point A is determined as the non-fork diversion position and navigation voice broadcast can be performed for this position when the cumulative steering angle on the target road segment is within the preset angle range (68 degrees, 110 degrees) and a distance 40 m between the first target position point A and an end point E of the target road segment is greater than a preset threshold 30 m.

The first target position point A is determined as the non-fork diversion position and navigation voice broadcast can be performed for this position when the cumulative steering angle on the target road segment is within the preset angle range (68 degrees, 110 degrees), the distance 30 m between the first target position point A and the start point S of the target road segment is greater than the preset threshold 20 m, and the distance 40 m between the first target position point A and the end point E of the target road segment is greater than the preset threshold 30 m.

The first target position point A is determined not to be the non-fork diversion position when the cumulative steering angle on the target road segment is not within the preset angle range (68 degrees, 110 degrees), or a distance 10 m between the first target position point A and the end point E of the target road segment is less than the preset threshold 30 m, or a distance 20 m between the first target position point A and the end point E of the target road segment is less than the preset threshold 30 m.

Through the embodiments provided by this application, the first set of road shape points on the target road segment are acquired from the map data; the target road segment is searched for the non-fork diversion position according to the target steering angle formed by the first set of road shape points, the non-fork diversion position being used for representing the turn road segment with the non-fork junction on the target road segment; and the navigation prompt information is set according to the non-fork diversion position and the navigation prompt information is broadcast when the non-fork diversion position is found and it is determined that the navigation prompt information needs to be set for the turn road segment according to the road information of the road segment adjacent to the target road segment. Therefore, the purpose of determining the navigation prompt information is set or not is determined when the road has the non-fork junction according to the target steering angle formed by the set of road shape points is realized, and whether navigation broadcast needs to be performed on the road target position or not is reasonably determined according to road parameters, thereby avoiding resource waste caused by voice broadcast on turn road segments not suitable for navigation broadcast on the road, and further reducing the situation of poor navigation effect due to interference caused to the driver by the unreasonable voice broadcast.

In some embodiments, the method may further include: determining whether navigation prompt information needs to be set for a turn road segment or not according to road information of a road segment adjacent to a target road segment.

The determining whether navigation prompt information needs to be set for a turn road segment or not according to road information of a road segment adjacent to a target road segment may include the following steps: determining whether the target road segment and the adjacent road segment form a roundabout-like road according to the road information of the road segment adjacent to the target road segment; and determining that the navigation prompt information does not need to be set for the turn road segment when it is determined that the target road segment and the adjacent road segment form the roundabout-like road.

It needs to be explained that the determining whether the target road segment and the adjacent road segment form a roundabout-like road according to the road information of the road segment adjacent to the target road segment may include the following steps:

S1. Determine whether the target road segment and the adjacent road segment form a closed road or not.

S2. Acquire a second set of road shape points on the adjacent road segment according to the road information of the road segment adjacent to the target road segment when it is determined that the target road segment and the adjacent road segment form the closed road.

S3. Determine a set of steering angles of the adjacent road segment according to the second set of road shape points.

S4. Determine that the target road segment and the adjacent road segment form the roundabout-like road under the situation that a difference value between a maximum steering angle and a minimum steering angle in the set of steering angles and the target steering angle is less than a preset first angle threshold.

In some embodiments, the determining whether navigation prompt information needs to be set for a turn road segment or not according to road information of a road segment adjacent to a target road segment may include the following steps: determining whether a target fork junction adjacent to the target road segment exists or not according to the road information of the road segment adjacent to the target road segment; and determining that the navigation prompt information does not need to be set for the turn road segment when it is determined that the target fork junction adjacent to the target road segment exists.

The determining whether a target fork junction adjacent to the target road segment exists or not according to the road information of the road segment adjacent to the target road segment may include the following steps: determining whether a fork junction adjacent to the target road segment exists or not according to the road information of the adjacent road segment; acquiring road directions of multiple adjacent roads connected to the fork junction when it is determined that the fork junction adjacent to the target road segment exists; and determining the fork junction as the target fork junction when there is a target adjacent road in the multiple adjacent roads, where a direction included angle between a road direction of the target adjacent road and a road direction of the target road segment is less than a preset second angle threshold.

In some embodiments, the acquiring a first set of road shape points associated with a target road segment from map data may include the following step: acquiring the first set of road shape points on the target road segment from the map data in a driving direction.

The setting navigation prompt information according to a non-fork diversion position may include the following steps: setting the navigation prompt information on a second target position on a target road where a target road segment is located, where the second target position is away from the non-fork diversion position by a preset target distance before driving to the non-fork diversion position in the driving direction, in other words, a distance between the second target position and the non-fork diversion position is the preset target distance, and the navigation prompt information is set in advance when driving to the position away from the non-fork diversion position by the preset target distance.

For example, assuming that the target preset distance is 20 m, after a non-fork diversion position point C is determined on the target road segment, the navigation prompt information is set at a point B behind the point C by 20 m. When a pedestrian or a vehicle drives to the second target position (such as point B) on the target road, navigation prompt information being "turn right at the position 20 m away from the front" can be broadcast, where the preset target distance may be 50 m and 80 m, and a specific value is not limited. The target road segment is a road segment on the target road.

In some embodiments, the method may further include the following steps: canceling the setting the navigation prompt information for the turn road segment when a non-fork diversion position is found and it is determined that the navigation prompt information is not to be broadcast for the turn road segment according to road information of the road segment adjacent to the target road segment.

Figure 6:
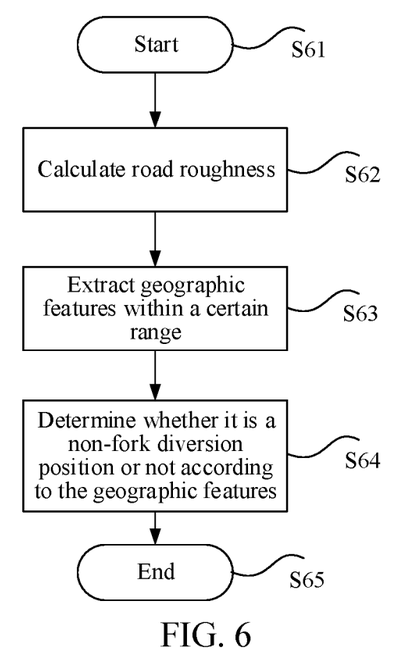
FIG. 6 is a flow chart of an exemplary non-fork junction voice broadcast method according to an embodiment of this application.

In some embodiments, this application further provides a non-fork junction voice broadcast method. FIG. 6 is a flow chart of the non-fork junction voice broadcast method.

Step S601. Start.

Step S602. Calculate road roughness.

The road roughness is used for representing road conditions. For example, there may be a fork junction, or a straight road segment instead of a fork path, or a ramp, a roundabout road, a dead end road, and the like in front of a non-fork curve road segment. The terminal can determine a shape point range for calculation of the road roughness of the road segment according to the road grade of the road, road property information, whether there are fork junctions in the front and rear, and the like and calculate the roughness of the road segment according to shape points within the shape point range. The road property information includes but not limited to scenarios such as a ramp, a JCT, an IC, an internal road, a roundabout, a Point of Interconnection (POI) connection road, a service area road, a dead end road and other roads.

Step S603. Extract geographic features within a certain range.

In this embodiment, the geographic features within a certain range may be understood as acquiring shape points on a target road segment. A terminal can calculate road parameters according to the shape points, and determine the geographic features of the range where the shape points of the target road segment are located, such steering angles, a cumulative steering angle, a distance between the shape points, a distance between the shape points and a start point, a distance between the shape points and an end point, etc. For example, road shape points within a certain range (400 m ahead if the road grade belongs to other roads) are acquired forwards in a current road driving direction. If there is the fork junction ahead, forward exploring continues along a road the same as the current road in road grade and road property, and having an angle difference from the current road is less than a preset angle (such as 5 degrees). If the road does not exist, forward exploring continues along a road having an angle difference less than a preset angle (such as 35 degrees) with the current road driving direction. The terminal will acquire all explored shape points.

Then, included angles between line segments formed by every three adjacent shape points are sequentially calculated, and refer to FIG. 5 which is a steering angle calculation schematic diagram. An included angle $\angle 123$ between an extension line of a line segment 12 between a shape point 1 and a shape point 2 and a line segment 23, a length of the line segment 12, a distance between the start point and the shape point 1 and a cumulative steering angle from the shape point 1 to a shape point 6 are calculated.

Step S604. Decide whether non-fork steering broadcast is performed or not according to the geographic features.

A steering angle position conforming to the following condition is found:
an absolute value of a steering angle at the position is less than absolute values of a front steering angle and a rear steering angle. The position is at a shape point 3 shown in FIG. 5.

Positions meet the following conditions are filtered:
1) A distance between the position (a point on a join curve) and the start point or the end point is less than 30 m.
2) The sum of cumulative steering angles within 30 m away from the position is less than 68 degrees or greater than 110 degrees.

The position not filtered is a non-fork diversion position.

Step S605. End.

Figure 7:
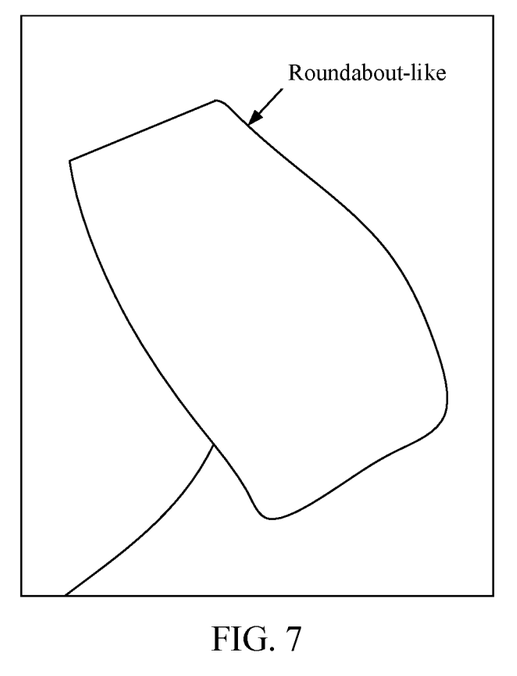
FIG. 7 is a schematic diagram of an exemplary roundabout-like road according to an embodiment of this application.

It needs to be explained that in this embodiment, the extracting features according to surrounding geographic features may include but not limited to following contents:
1) Roundabout-Like Determination FIG. 7 is a roundabout-like road schematic diagram, forward exploring is performed by a certain distance along a road needing non-fork prompt, and if a closed loop can be formed, whether the closed loop is a smooth circle or not is determined according to all shape points of the passed road.

Step 1. Forwards explore by 5 fixed steps in the driving direction, and subsequent determination is not performed if a ring shape, namely, end-to-end connection, is not formed within the 5 fixed steps.

Step 2. Calculate steering angles at all shape points on a route according to the same mode in step S603, and it is considered that the road is roundabout-like if a difference value between a maximum steering angle and a minimum steering angle is less than 45 degrees.

The navigation prompt information is not set for a roundabout-like scenario.

2) Junction Calculation

Figure 8:
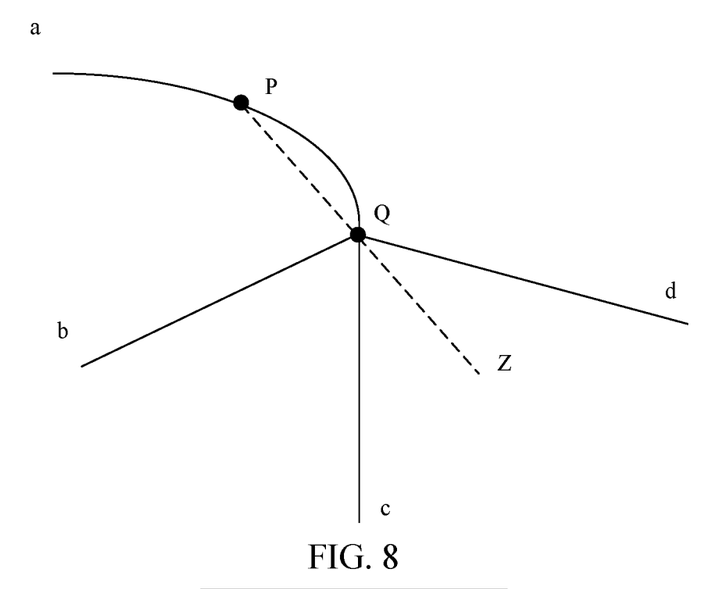
FIG. 8 is a schematic diagram of exemplary fork junction calculation according to an embodiment of this application.

FIG. 8 is a junction calculation schematic diagram. It is determined that a non-fork diversion position is located at a position P for a road a. Then, reverse expanding is performed by a certain distance along the road a to acquire geographic features (whether the fork junction exists or not, acquiring road grades and road property of connecting sides and included angles between the connecting sides and a roadside road if there is the fork junction) within the distance.

Step 1. Explore by a certain distance along a, and find the fork junction at a point Q.

Step 2. Traverse adjacent sides at the point Q.

Step 3. Skip setting the navigation prompt information to the position P if there is an adjacent side b similar to a direction a at the point Q.

Step 4. Continue exploring along an adjacent side c forming an included angle within 30 degrees with PQ if there is no adjacent side similar to the direction a at the point Q, otherwise, end exploring.

If the position is not filtered by the above steps, the navigation prompt information needs to be set for the position.

According to the embodiments provided by this application, the non-fork voice broadcast method adopts the richer geographic features to describe and express the non-fork junction and can more accurately recognize whether voice broadcast prompt needs to be performed on the non-fork junction or not.

This embodiment is a specific implementation according to static data. In addition, a machine learning mode may be adopted, and a machine learning model is outputted by learning geographic features of a road needing non-fork voice broadcast for non-fork voice broadcast prompt.

For each of the foregoing method embodiments, for ease of description, the method embodiments are described as a series of action combinations, but a person skilled in the art learns that this application is not limited to an order of described actions, because according to this application, some steps may be performed in another order or at the same time. In addition, a person skilled in the art is also to learn that the embodiments described in this specification are all exemplary embodiments, and the involved actions and modules are not necessarily required to this application.

Figure 9:
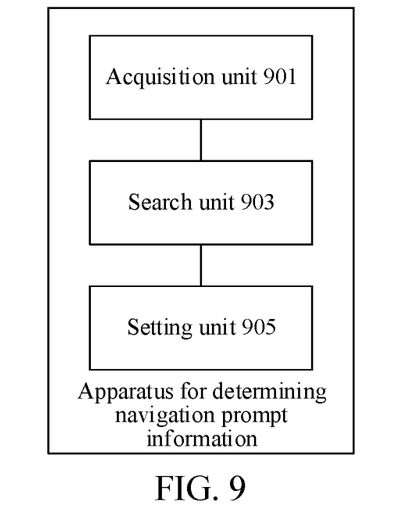
FIG. 9 is a schematic structural diagram of an exemplary apparatus for determining navigation prompt information according to an embodiment of this application.

According to another aspect of the embodiments of this application, an apparatus for determining navigation prompt information for implementing the method for determining navigation prompt information. As shown in FIG. 9, the apparatus for determining navigation prompt information includes an acquisition unit 901, a search unit 903 and a setting unit 905.

The acquisition unit 901 is configured to acquire a first set of road shape points associated with a target road segment from map data.

The search unit 903 is configured to determine at least one target steering angle between every two adjacent line segments formed by every three adjacent road shape points in the first set of road shape points, and search the target road segment for a non-fork diversion position according to the target steering angle, the non-fork diversion position being used for indicating that the target road segment includes a turn road segment with a non-fork junction on the target road segment.

The setting unit 905 is configured to set the navigation prompt information according to the non-fork diversion position when the non-fork diversion position is found and it is determined that the navigation prompt information is to be broadcast for the turn road segment according to road information of a road segment adjacent to the target road segment in a preset driving direction along the target road segment.

In some embodiments, the search unit 903 may include a first acquisition module, configured to acquire the steering angle formed by every three adjacent road shape points in the first set of road shape points to form a set of steering angles, where the steering angle formed by the every three adjacent road shape points includes included angles between extension lines of first line segment and second line segments, the first line segments are line segments between first road shape points and second road shape points in the every three adjacent road shape points, and second line segments are line segments between the second road shape points and third road shape points in the every three adjacent road shape points; and a search module, configured to search the target road segment for the non-fork diversion position according to the set of steering angles.

The search module may include a first determining submodule, configured to determine a cumulative steering angle corresponding to a first target position on the target road segment according to the set of steering angles; and a second determining submodule, configured to determine whether the first target position is the non-fork diversion position or not according to the cumulative steering angle.

The first determining submodule is further configured to execute following operation: acquiring a set of three-adjacent road shape points corresponding to the first target position from the first set of road shape points, where a distance between the first target position and a second road shape point in every three adjacent road shape points in the set of three-adjacent road shape points is less than a preset first distance threshold; acquiring steering angles formed by the set of three-adjacent road shape points from the set of steering angles; and determining the cumulative steering angle to be equal to the cumulative sum of the steering angles formed respectively by the set of three-adjacent road shape points.

In this embodiment, the cumulative sum of one or more steering angles, meeting conditions, selected from the set of steering angles of the target road segment as a target steering angle of the target road segment.

It needs to be explained that the second determining submodule is further configured to execute following operation:

determining the first target position as the non-fork diversion position when the cumulative steering angle is within a preset angle range; or determining the first target position as the non-fork diversion position when the cumulative steering angle is within the preset angle range, and a distance between the first target position and a start point in the first set of road shape points is greater than a preset first distance threshold; or determining the first target position as the non-fork diversion position when the cumulative steering angle is within the preset angle range, and a distance between the first target position and an end point in the first set of road shape points is greater than a preset second distance threshold; or determining the first target position as the non-fork diversion position when the cumulative steering angle is within the preset angle range, the distance between the first target position and the start point in the first set of road shape points is greater than the preset first distance threshold, and the distance between the first target position and the end point in the first set of road shape points is greater than the preset second distance threshold.

According to an embodiment provided by this application, the acquisition unit 901 acquires the first set of road shape points on the target road segment from the map data; the search unit 903 searches the target road segment for the non-fork diversion position according to the target steering angle formed by the first set of road shape points, where the non-fork diversion position is used for representing the turn road segment with the non-fork junction on the target road segment; and the setting unit 905 sets the navigation prompt information according to the non-fork diversion position and broadcasts the navigation prompt information when the non-fork diversion position is found and it is determined that the navigation prompt information needs to be set for the turn road segment according to the road information of the road segment adjacent to the target road segment. Therefore, the purpose of determining whether the navigation prompt information is set or not according to the target steering angle formed by the set of road shape points when there is the non-fork junction on the road is realized, thereby achieving the technical effect of reasonably determining whether navigation broadcast is performed at the road target position or not according to road parameters and then solving the technical problem in the related art that navigation position broadcast is improper in a map navigation process, which causes interference to a user In some embodiments, the apparatus may further include a determining unit, configured to determine whether the navigation prompt information needs to be set for the turn road segment or not according to the road information of the road segment adjacent to the target road segment.

The determining unit may include a first determining module, configured to determine whether the target road segment and the adjacent road segment form the roundabout-like road according to the road information of the road segment adjacent to the target road segment; and a second determining module, configured to determine that the navigation prompt information does not need to be set for the turn road segment when it is determined that the target road segment and the adjacent road segment form the roundabout-like road.

In some embodiments, the first determining module may include a third determining submodule, configured to determine whether the target road segment and the adjacent road segment form a closed road or not; a first acquisition submodule, configured to acquire a second set of road shape points on the adjacent road segment according to the road information of the road segment adjacent to the target road segment when it is determined that the target road segment and the adjacent road segment form the closed road; a fourth determining submodule, configured to determine a set of steering angles of the adjacent road segment according to the second set of road shape points; and a fifth determining submodule, configured to determine that the target road segment and the adjacent road segment form the roundabout-like road under the situation that a difference value between a maximum steering angle and a minimum steering angle in the set of steering angles is less than a preset first angle threshold.

In some embodiments, the determining unit may include a third determining module, configured to determine whether a target fork junction adjacent to the target road segment exists or not according to the road information of the road segment adjacent to the target road segment; and a fourth determining module, configured to determine that the navigation prompt information does not need to be set for the turn road segment when it is determined that the target fork junction adjacent to the target road segment exists.

The third determining module may include a sixth determining submodule, configured to determine whether a fork junction adjacent to the target road segment exists or not according to the road information of the adjacent road segment; a second acquisition submodule, configured to acquire road directions of multiple adjacent roads connected to the fork junction when it is determined that the fork junction adjacent to the target road segment exists; and a seventh determining submodule, configured to determine the fork junction as the target fork junction when there is a target adjacent road in the multiple adjacent roads, where a direction included angle between a road direction of the target adjacent road and a road direction of the target road segment is less than a preset second angle threshold.

In some embodiments, the acquisition unit 901 may include a second acquisition module, configured to acquire the first set of road shape points on the target road segment from the map data in the driving direction. The setting unit 905 may include a setting module, configured to set the navigation prompt information on a second target position on a target road where the target road segment is located, where the second target position is located in front of the non-fork diversion position in the driving direction, and a distance between the second target position and the non-fork diversion position is a preset target distance.

The acquisition unit 901 may include a fifth determining module, configured to determine a target end point in a preset driving direction from a target start point on the target road from the map data, where a road segment between the target start point and the target end point is the target road segment; a third acquisition module, configured to acquire the first set of road shape points on the road segment between the target start point and the target end point; a sixth determining module, configured to determine a point reached after advancing by the preset distance as the target end point in response to without passing by the fork junction in the process of advancing by the preset distance in the driving direction from the target start point; a seventh determining module, configured to determine a target point on the target adjacent road as the target end point in response to passing by the fork junction in the process of advancing by the preset distance in the driving direction from the target start point under the situation that the target adjacent road exists in the multiple adjacent roads connected to the fork junction, where a distance between the target end point and the target start point is the preset distance, an angle between a road direction of the target adjacent road and the driving direction is less than a preset third angle threshold, or the angle between the road direction of the target adjacent road and the driving direction is less than a preset fourth angle threshold, and the target adjacent road has the same road grade and/or the same road property as the target road; and an eighth determining module, configured to determine a point where the fork junction is located as the target end point in response to passing by the fork junction in the process of advancing by the preset distance in the driving direction from the target start point under the situation that there is no target adjacent road in the multiple adjacent roads connected to the fork junction.

In some embodiments, the apparatus may further include a navigation cancel unit, configured to cancel the setting the navigation prompt information for the turn road segment when the non-fork diversion position is found and it is determined that the navigation prompt information is not to be broadcast for the turn road segment according to the road information of the road segment adjacent to the target road segment.

Figure 10:
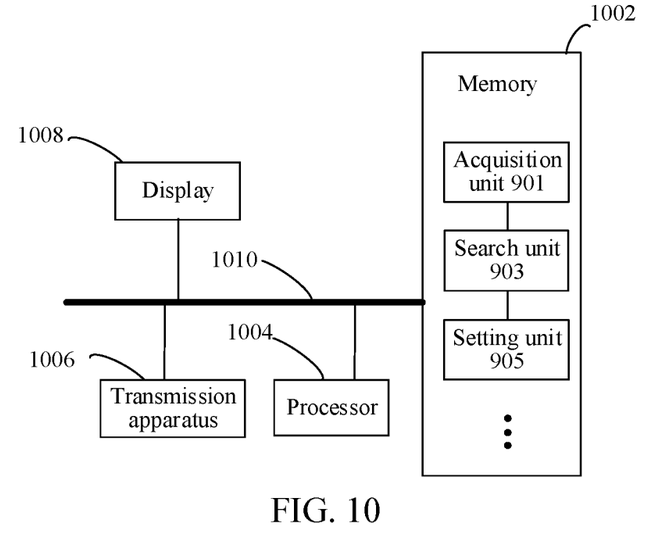
FIG. 10 is a schematic structural diagram of an exemplary electronic device according to an embodiment of the present disclosure.

According to still another aspect of embodiments of this application, an electronic device is further provided, and is configured to implement the method for determining navigation prompt information. The electronic device may be a terminal or server shown in FIG. 1. In this embodiment, an example in which an electronic device serves as the server is used for description. As shown in FIG. 10, the electronic device includes a memory 1002 and a processor 1004. The memory 1002 stores computer-readable instructions. The processor 1004 is configured to perform the steps in any one of the foregoing method embodiments by using the computer-readable instructions.

In some embodiments, the electronic device may be located in at least one of a plurality of network devices of a computer network.

In some embodiments, the foregoing processor may be configured to perform the following steps by using computer-readable instructions:

S1. Acquire a first set of road shape points associated with a target road segment from map data.

S2. Search the target road segment for a non-fork diversion position according to a target steering angle formed by the first set of road shape points, the non-fork diversion position being used for indicating that the target road segment includes a turn road segment with a non-fork junction on the target road segment.

S3. Set the navigation prompt information and broadcast the navigation prompt information according to the non-fork diversion position when the non-fork diversion position is found and it is determined that the navigation prompt information is to be broadcast for the turn road segment according to road information of a road segment adjacent to the target road segment.

In some embodiments, a person of ordinary skill in the art may understand that, the structure shown in FIG. 10 is only schematic. The electronic apparatus or the electronic device may be a terminal device such as a smartphone (such as an Android mobile phone or an iOS mobile phone), a tablet computer, a palmtop computer, a mobile internet device (MID), or a PAD. FIG. 10 does not limit the structures of the electronic apparatus and the electronic device. For example, the electronic apparatus and the electronic device may include more or fewer components than those shown in FIG. 10 (such as a network interface), or possess a different configuration than that shown in FIG. 10.

The memory 1002 may be configured to store a software program and module, for example, a program instruction/module corresponding to the method and apparatus for determining navigation prompt information in the embodiments of this application, and the processor 1004 runs the software program and module stored in the memory 1002, to perform various function applications and data processing, that is, implement the method for determining navigation prompt information. The memory 1002 may include a high-speed random access memory, and may further include a non-volatile memory, for example, one or more disk storage apparatuses, a flash memory, or other non-volatile solid-state memories. In some embodiments, the memory 1002 may further include memories disposed remotely from the processor 1004. The remote memories may be connected to the terminal by a network. Examples of the above network include, but are not limited to, the Internet, an intranet, a local area network, a mobile communication network, and a combination thereof. The memory 1002 may be specifically configured to, but not limited to, store information such as a set of shape points on the target road segment, a target steering angle and navigation information. In an example, as shown in FIG. 10, the memory 1002 may include, but not limited to, the acquisition unit 901, the search unit 903, and the setting unit 905 in the foregoing apparatus for determining navigation prompt information. In addition, the memory 1002 may further include, but not limited to, other modules and units in the apparatus for determining navigation prompt information. Details are not described herein again.

In some embodiments, the transmission apparatus 1006 is configured to receive or send data through a network. Specific examples of the network may include a wired network and a radio network. In an example, the transmission apparatus 1006 includes a network adapter (NIC). The network adapter may be connected to other network devices and routers through a network cable so as to communicate with the Internet or a local area network. In an example, the transmission apparatus 1006 is a radio frequency (RF) module, configured to communicate with the Internet in a wireless manner.

In addition, the electronic device further includes: a display 1008, configured to display the target road segment; and a connection bus 1010, configured to connect module components in the electronic device.

In other embodiments, the foregoing terminal device or server may be a node in a distributed system. The distributed system may be a blockchain system. The blockchain system may be a distributed system formed by multiple nodes connected in the form of network communication. A peer-to-peer (P2P) network may be formed between the nodes. Any form of computing devices such as electronic devices like a server or a terminal may become a node in the blockchain system by joining the peer-to-peer network.

According to an aspect of this application, a computer program product or a computer program is provided, including computer-readable instructions, the computer-readable instructions being stored in a computer-readable storage medium. A processor of a computer device reads computer-readable instructions from a computer-readable storage medium, and executes the computer-readable instructions, so that the computer device executes the method for determining navigation prompt information, provided by a navigation prompt information determining way or other implementations for the navigation prompt information determining way. The computer-readable instructions are configured to perform the steps in any one of the foregoing method embodiments when running.

In some embodiments, the computer-readable storage medium may be configured to store computer-readable instructions for performing the following steps:

S1. Acquire a first set of road shape points associated with a target road segment from map data.

S2. Search the target road segment for a non-fork diversion position according to a target steering angle formed by the first set of road shape points, the non-fork diversion position being used for indicating that the target road segment includes a turn road segment with a non-fork junction on the target road segment.

S3. Set the navigation prompt information and broadcast the navigation prompt information according to the non-fork diversion position when the non-fork diversion position is found and it is determined that the navigation prompt information is to be broadcast for the turn road segment according to road information of a road segment adjacent to the target road segment.

In some embodiments, a person of ordinary skill in the art may understand that all or some of the steps of the methods in the foregoing embodiments may be implemented by a program indicating relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purpose, and are not intended to indicate the preference among the embodiments.

The integrated units in the foregoing embodiments, if implemented in the form of a software functional unit and sold or used as a stand-alone product, may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, the description about each embodiment emphasizes a different facet. For a part that is not detailed in one embodiment, reference may be made to the relevant description in other embodiments.

In the embodiments provided in this application, it is understandable that the disclosed client may be implemented in other forms. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed couplings between different parts or direct couplings or communication connections may be indirect couplings or communication connections implemented through some interfaces, units, or modules, and may be implemented electrically or in other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments hereof.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

The above descriptions are merely preferred embodiments of this application, and a person of ordinary skill in the art may make various improvements and modifications without departing from the principle of this application. All such improvements and modifications shall also fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for determining navigation prompt information performed by a computer device, comprising:
    acquiring a first set of road shape points associated with a target road segment from map data;
    determining at least one target steering angle between every two adjacent line segments formed by every three adjacent road shape points in the first set of road shape points;
    searching the target road segment for a non-fork diversion position according to the target steering angle, the non-fork diversion position being used for indicating that the target road segment includes a turn road segment with a non-fork junction on the target road segment; and
    setting the navigation prompt information according to the non-fork diversion position when it is determined that the navigation prompt information is to be broadcast for the turn road segment according to road information of a road segment adjacent to the target road segment in a preset driving direction along the target road segment.

2. The method according to claim 1, wherein the searching the target road segment for a non-fork diversion position according to the target steering angle comprises:
    determining every three adjacent road shape points in the first set of road shape points;
    determining first line segments between first road shape points and second road shape points in the every three adjacent road shape points, and second line segments between the second road shape points and third road shape points in the every three adjacent road shape points;
    making included angles between extension lines of the first line segments and the second line segments as a set of steering angles formed by the every three adjacent road shape points; and
    determining a target steering angle corresponding to a first target position from the set of steering angles and determining whether the first target position is the non-fork diversion position on the target road segment or not according to the target steering angle.

3. The method according to claim 1, further comprising:
    determining whether the navigation prompt information needs to be set for the turn road segment or not according to the road information of the road segment leading to the target road segment in the preset driving direction.

4. The method according to claim 1, further comprising: determining whether the navigation prompt information needs to be set for the turn road segment or not according to the road information of the road segment following the target road segment in the preset driving direction.

5. The method according to claim 1, wherein the setting navigation prompt information according to the non-fork diversion position comprises:
setting the navigation prompt information on a second target position on the target road segment, the second target position being located in front of the non-fork diversion position in the preset driving direction, and a distance between the second target position and the non-fork diversion position being a preset target distance.

6. The method according to claim 1, the acquiring a first set of road shape points associated with a target road segment from map data comprises:
determining a target end point in the preset driving direction from a target start point on a target road in the map data, a road segment between the target start point and the target end point being the target road segment; and
acquiring the first set of road shape points on the road segment between the target start point and the target end point.

7. The method according to claim 1, further comprising: canceling the setting the navigation prompt information for the turn road segment when it is determined that the navigation prompt information does not need to be broadcast for the turn road segment according to the road information of the road segment adjacent to the target road segment.

8. A computer device, comprising a memory and one or more processors, the memory storing computer-readable instructions, the computer-readable instructions, when executed by the one or more processors, causing the computer device to perform a method for determining navigation prompt information, the method including:
acquiring a first set of road shape points associated with a target road segment from map data;
determining at least one target steering angle between every two adjacent line segments formed by every three adjacent road shape points in the first set of road shape points;
searching the target road segment for a non-fork diversion position according to the target steering angle, the non-fork diversion position being used for indicating that the target road segment includes a turn road segment with a non-fork junction on the target road segment; and
setting the navigation prompt information according to the non-fork diversion position when it is determined that the navigation prompt information is to be broadcast for the turn road segment according to road information of a road segment adjacent to the target road segment in a preset driving direction along the target road segment.

9. The computer device according to claim 8, wherein the searching the target road segment for a non-fork diversion position according to the target steering angle comprises:
determining every three adjacent road shape points in the first set of road shape points;
determining first line segments between first road shape points and second road shape points in the every three adjacent road shape points, and second line segments between the second road shape points and third road shape points in the every three adjacent road shape points;
making included angles between extension lines of the first line segments and the second line segments as a set of steering angles formed by the every three adjacent road shape points; and
determining a target steering angle corresponding to a first target position from the set of steering angles and determining whether the first target position is the non-fork diversion position on the target road segment or not according to the target steering angle.

10. The computer device according to claim 8, wherein the method further comprises:
determining whether the navigation prompt information needs to be set for the turn road segment or not according to the road information of the road segment leading to the target road segment in the preset driving direction.

11. The computer device according to claim 8, wherein the method further comprises:
determining whether the navigation prompt information needs to be set for the turn road segment or not according to the road information of the road segment following the target road segment in the preset driving direction.

12. The computer device according to claim 8, wherein the setting navigation prompt information according to the non-fork diversion position comprises:
setting the navigation prompt information on a second target position on the target road segment, the second target position being located in front of the non-fork diversion position in the preset driving direction, and a distance between the second target position and the non-fork diversion position being a preset target distance.

13. The computer device according to claim 8, the acquiring a first set of road shape points associated with a target road segment from map data comprises:
determining a target end point in the preset driving direction from a target start point on a target road in the map data, a road segment between the target start point and the target end point being the target road segment; and
acquiring the first set of road shape points on the road segment between the target start point and the target end point.

14. The computer device according to claim 8, wherein the method further comprises:
canceling the setting the navigation prompt information for the turn road segment when it is determined that the navigation prompt information does not need to be broadcast for the turn road segment according to the road information of the road segment adjacent to the target road segment.

15. One or more non-transitory computer readable storage media that store computer readable instructions, when executed by one or more processors of a computer device, causing the computer device to implement a method for determining navigation prompt information, the method including:
acquiring a first set of road shape points associated with a target road segment from map data;

determining at least one target steering angle between every two adjacent line segments formed by every three adjacent road shape points in the first set of road shape points;

searching the target road segment for a non-fork diversion position according to the target steering angle, the non-fork diversion position being used for indicating that the target road segment includes a turn road segment with a non-fork junction on the target road segment; and setting the navigation prompt information according to the non-fork diversion position when it is determined that the navigation prompt information is to be broadcast for the turn road segment according to road information of a road segment adjacent to the target road segment in a preset driving direction along the target road segment.

16. The non-transitory computer readable storage media according to claim 15, wherein the searching the target road segment for a non-fork diversion position according to the target steering angle comprises:

determining every three adjacent road shape points in the first set of road shape points;

determining first line segments between first road shape points and second road shape points in the every three adjacent road shape points, and second line segments between the second road shape points and third road shape points in the every three adjacent road shape points;

making included angles between extension lines of the first line segments and the second line segments as a set of steering angles formed by the every three adjacent road shape points; and determining a target steering angle corresponding to a first target position from the set of steering angles and determining whether the first target position is the non-fork diversion position on the target road segment or not according to the target steering angle.

17. The non-transitory computer readable storage media according to claim 15, wherein the method further comprises:

determining whether the navigation prompt information needs to be set for the turn road segment or not according to the road information of the road segment leading to the target road segment in the preset driving direction.

18. The non-transitory computer readable storage media according to claim 15, wherein the method further comprises:

determining whether the navigation prompt information needs to be set for the turn road segment or not according to the road information of the road segment following the target road segment in the preset driving direction.

19. The non-transitory computer readable storage media according to claim 15, wherein the setting navigation prompt information according to the non-fork diversion position comprises:

setting the navigation prompt information on a second target position on the target road segment, the second target position being located in front of the non-fork diversion position in the preset driving direction, and a distance between the second target position and the non-fork diversion position being a preset target distance.

20. The non-transitory computer readable storage media according to claim 15, the acquiring a first set of road shape points associated with a target road segment from map data comprises:

determining a target end point in the preset driving direction from a target start point on a target road in the map data, a road segment between the target start point and the target end point being the target road segment; and acquiring the first set of road shape points on the road segment between the target start point and the target end point.

* * * * *